US009090741B2

(12) United States Patent
Morschhaeuser et al.

(10) Patent No.: US 9,090,741 B2
(45) Date of Patent: Jul. 28, 2015

(54) COMB POLYMERS AND THE USE THEREOF IN WASHING AND CLEANING AGENTS

(75) Inventors: Roman Morschhaeuser, Mainz (DE); Georg Borchers, Bad Nauheim (DE); Hans-Juergen Scholz, Alzenau (DE)

(73) Assignee: Clariant Finance (BVI) Limited, Tortola (VG)

( * ) Notice: Subject to any disclaimer, the term of this patent is extended or adjusted under 35 U.S.C. 154(b) by 400 days.

(21) Appl. No.: 13/318,632

(22) PCT Filed: Apr. 30, 2010

(86) PCT No.: PCT/EP2010/002647
§ 371 (c)(1),
(2), (4) Date: Nov. 3, 2011

(87) PCT Pub. No.: WO2010/127809
PCT Pub. Date: Nov. 11, 2010

(65) Prior Publication Data
US 2012/0065119 A1    Mar. 15, 2012

(30) Foreign Application Priority Data
May 7, 2009   (DE) .......................... 10 2009 020 299

(51) Int. Cl.
| | | |
|---|---|---|
| C11D 3/37 | (2006.01) | |
| C08G 63/668 | (2006.01) | |
| C08G 63/20 | (2006.01) | |
| C11D 3/00 | (2006.01) | |

(52) U.S. Cl.
CPC .............. *C08G 63/668* (2013.01); *C08G 63/20* (2013.01); *C11D 3/0036* (2013.01); *C11D 3/3788* (2013.01); *C08G 2261/128* (2013.01); *C11D 3/37* (2013.01)

(58) Field of Classification Search
CPC ................................ C11D 3/37; C11D 3/0036
USPC ................. 510/400, 475; 525/329.8
See application file for complete search history.

(56) References Cited

U.S. PATENT DOCUMENTS

| | | | |
|---|---|---|---|
| 4,427,557 A | 1/1984 | Stockburger | |
| 4,702,857 A | 10/1987 | Gosselink | |
| 4,721,580 A | 1/1988 | Gosselink | |
| 4,968,451 A | 11/1990 | Scheibel et al. | |
| 5,142,020 A | 8/1992 | Kud et al. | |
| 5,415,807 A | 5/1995 | Gosselink et al. | |
| 5,691,298 A | 11/1997 | Gosselink et al. | |
| 6,255,274 B1 * | 7/2001 | Becherer et al. ............. 510/475 |
| 6,833,419 B2 | 12/2004 | Morschhaeuser et al. | |
| 6,891,011 B2 | 5/2005 | Morschhaeuser et al. | |
| 6,924,035 B2 * | 8/2005 | Auweter et al. ............. 428/407 |
| 6,951,913 B2 * | 10/2005 | Morschhauser et al. ........ 528/26 |
| 6,964,995 B2 | 11/2005 | Morschhauser et al. | |
| 7,022,791 B2 | 4/2006 | Loeffler et al. | |
| 7,025,973 B2 | 4/2006 | Loeffler et al. | |
| 7,026,408 B2 * | 4/2006 | Detert et al. ............... 525/329.8 |
| 7,053,146 B2 | 5/2006 | Morschhaeuser et al. | |
| 7,081,507 B2 | 7/2006 | Morschhaeuser et al. | |
| 7,129,299 B2 * | 10/2006 | Detert et al. ............... 525/329.7 |
| 7,151,137 B2 | 12/2006 | Morschhaeuser et al. | |
| 7,186,405 B2 | 3/2007 | Loeffler et al. | |
| 7,186,774 B2 | 3/2007 | Morschhaeuser et al. | |
| 7,244,421 B2 | 7/2007 | Loeffler et al. | |
| 7,279,154 B2 | 10/2007 | Loeffler et al. | |
| 7,297,328 B2 | 11/2007 | Loeffler et al. | |
| 7,332,155 B2 | 2/2008 | Loeffler et al. | |
| 7,393,520 B2 | 7/2008 | Loeffler et al. | |
| 7,399,478 B2 | 7/2008 | Loeffler et al. | |
| 7,943,157 B2 | 5/2011 | Loeffler et al. | |
| 8,062,630 B2 | 11/2011 | Loeffler et al. | |
| 8,187,581 B2 | 5/2012 | Loeffler et al. | |
| 8,404,472 B2 | 3/2013 | Zucca et al. | |
| 2002/0182171 A1 * | 12/2002 | Detert et al. ............... 424/78.27 |
| 2003/0072734 A1 * | 4/2003 | Detert et al. ............... 424/78.17 |
| 2004/0048749 A1 * | 3/2004 | Zerrer et al. ................... 504/359 |
| 2004/0072966 A1 * | 4/2004 | Morschhauser et al. ...... 525/474 |
| 2005/0113529 A1 * | 5/2005 | Detert et al. ............... 525/329.8 |
| 2007/0249515 A1 * | 10/2007 | Borchers et al. ............. 510/504 |
| 2009/0036641 A1 * | 2/2009 | Lang et al. ..................... 528/295 |
| 2011/0098418 A1 * | 4/2011 | Morschhaeuser et al. .... 525/437 |

FOREIGN PATENT DOCUMENTS

| | | |
|---|---|---|
| DE | 199 43 436 | 3/2001 |
| EP | 1 035 194 | 9/2000 |
| JP | S47-5108 | 2/1972 |
| JP | H1-132636 | 5/1989 |
| JP | H05-25259 | 2/1993 |
| JP | 2009-528041 | 3/2013 |
| WO | WO 01/23515 | 4/2001 |

OTHER PUBLICATIONS

International Search Report for PCT/EP2010/002647, dated Jul. 13, 2010.
Translation of International Preliminary Report on Patentability for PCT/EP2010/002647, dated Nov. 9, 2011.
English abstract of DE 199 43 436, Mar. 15, 2001.
English abstract of JP-S47-5108, Feb. 14, 1972.
English abstract of JP-H1-132636, May 25, 1989.

* cited by examiner

*Primary Examiner* — Gregory Webb
(74) *Attorney, Agent, or Firm* — Tod A. Waldrop

(57) ABSTRACT

The invention relates to a comb polymer made of a polymer main chain and polyester side chains linked to said polymer main chain via ester groups, characterized in that (i) the polymer main chain is a polycarbolic acid or a copolymer polycarbolic acid (A), (ii) the polyester side chains comprises the components (B1) $C_8$-dicarbolic acids, optionally sulfonated, (B2) dioles and/or polyethers having 2 OH groups, and (C) non-ionic terminal groups of the formula -0-$(AO)_xR$, where A means ethylene, propylene, or butylene, x is a number from 1 to 100, and R is a hydrocarbon radical having 1 to 30 C atoms; (iii) the total percent by mass of the polyester side chains B1+B2+C is 80 to 99.9%, relative to the total mass of the comb polymer; (iv) the polyester side chains are obtained from an esterification reaction of the components B1, B2, and C at a mass ratio B1+B2/C of 2:1 to 100:1.

14 Claims, No Drawings

COMB POLYMERS AND THE USE THEREOF IN WASHING AND CLEANING AGENTS

The invention relates to water-soluble and/or water-dispersible comb polymers composed of a main polymer chain which carries polyester side arms linked via ester groups, the polyester side arms being endcapped with nonionic groups. These comb polyesters are used as soil release polyesters in detergent compositions.

U.S. Pat. No. 4,427,557 describes polyesters having molecular weights in the region of 2000 and 10 000 g/mol, prepared from the monomers ethylene glycol (1), polyethylene glycol (2) having molecular weights of 200 to 1000 g/mol, aromatic dicarboxylic acids (3), and alkali metal salts of sulfonated aromatic dicarboxylic acids (4), and praises their soil release effect on polyester fabrics.

U.S. Pat. No. 4,702,857 claims polyesters of ethylene glycol, 1,2-propylene glycol or mixtures thereof (1), polyethylene glycol having at least 10 glycol units and capped at one end with a short-chain alkyl group, more particularly with a methyl group (2), a dicarboxylic acid and/or dicarboxylic ester (3), and, optionally, alkali metal salts of sulfonated aromatic dicarboxylic acids (4).

U.S. Pat. No. 4,721,580 discloses polyesters having terephthalate units and sulfone-containing end groups, more particularly sulfoethoxylated end groups $MO_3S(CH_2CH_2O)_n$—H, and praises their use in laundry detergents and fabric softeners.

U.S. Pat. No. 4,968,451 describes polyesters with sulfone-containing end groups, obtained by copolymerization of (meth)allyl alcohol, alkylene oxide, aryldicarboxylic acid, and $C_2$-$C_4$ glycol, and subsequent sulfonation.

U.S. Pat. No. 5,415,807 refers to the propensity of soil release polymers having sulfonated polyethoxy/propoxy end groups toward crystallization, resulting in a reduction in the soil release effects. The specification teaches that the crystallization propensity of the SRPs can be suppressed by adding hydrotropes.

U.S. Pat. No. 5,691,298 claims soil release polymers with a branched backbone made up of di- or polyhydroxysulfonate, terephthalate units and 1,2-oxyalkyleneoxy units with nonionic or anionic end groups.

WO 01/23515 praises anionic polyesters and their use for cleaning hard surfaces, characterized in that the polyesters contain end groups containing sulfo groups. These polyester types are sticky and present problems for solid applications.

EP 1 035 194 describes comblike polyesters which have endcap groups comprising monoalkyl- or dialkylamines, alcohols, carboxylic acids or groups containing sulfone groups, and also the use thereof in detergent compositions.

In respect of their applications-relevant properties, particularly in terms of soil release effect, water solubility, and also hygroscopicity and consistency, existing soil release polymers are not entirely satisfactory for application in detergent compositions. During the synthesis of the polyesters in question, moreover, increasing degree of sulfonation is accompanied by sharp rises in melt viscosities and hence in considerable processing problems. At melt viscosities above 50 000 mPas at 200° C., stirring becomes increasingly hindered in the reactor, and it is barely still possible to discharge the polymer melt fully from the reactor.

The object of the present invention was to provide polyesters for use in detergent compositions that are highly water-soluble, exhibit very good soil release effect, are compatible with adjuvants and auxiliaries customary in detergent compositions, are easily incorporated into formulations, and are stable with respect to hydrolysis. They ought to be readily and spontaneously water-soluble at temperatures below 60° C., and ought to fully develop their effect in detergent compositions, and also to exhibit an improved cleaning and clear-rinse profile even in the case of reduced rinse water consumption.

Moreover, these polyesters are to have melt viscosities of not more than 50 000 mPas at 200° C.

It has surprisingly been found that this object is achieved by means of certain comb polyesters, as defined below.

The invention provides comb polymers composed of a main polymer chain and of polyester side chains linked via ester groups to said main polymer chain, characterized
  (i) in that the main polymer chain is a polycarboxylic acid or a copolymer polycarboxylic acid (A),
  (ii) in that the polyester side chains comprise the constituents (B1) $C_8$ dicarboxylic acids, which are optionally sulfonated, (B2) diols and/or polyol ethers having 2 OH groups, and (C) nonionic end groups of the formula —O-(AO)$_x$R, where A is ethylene, propylene or butylene, x is a number from 1 to 100, and R is a hydrocarbon radical having 1 to 30 carbon atoms;
  (iii) in that the total mass percentage of the polyester side chains B1+B2+C is 80% to 99.9%, preferably 90% to 99.8%, more preferably 93% to 99.5%, based on the total mass of the comb polymer;
  (iv) in that the polyester side chains are obtained by an esterification reaction of components B1, B2, and C in a B1+B2/C mass ratio of 2:1 to 100:1, preferably 3:1 to 40:1, more preferably 4:1 to 15:1.

The comb polymers of the invention are notable for good soil release effect and dispersing capacity. They are readily and spontaneously water-soluble at temperatures below 60° C. Particularly advantageous for the production procedure is that they have melt viscosities at 200° C. in the range from 1000 to 50 000 mPas, preferably 5000 to 45 000 mPas, more preferably 15 000 to 35 000 mPas.

The melt viscosities were determined using a Haake RV2 rotary viscometer at 200° C. and also at 230° C.

The number-average molecular weights Mn of preferred comb polymers of the invention are situated in the range from 800 to 25 000 g/mol, more particularly 1000 to 16 000 g/mol, with particular preference 1200 to 12 000 g/mol.

Preferred comb polyesters of the invention are further characterized in that they have a flow factor ffc of more than 8, preferably of 10 to 30.

Preferred comb polyesters of the invention are further characterized in that they have a melting point (defined as the peak maximum from differential scanning calorimetry) of more than 40° C., preferably more than 50° C., more particularly more than 55° C.

Particularly preferred comb polyesters of the invention are characterized in that, in addition to the flow factor and the melting point as defined above, they have a number-average molecular weight Mn of 1500 to 16 000 g/mol.

The polycarboxylic acids (A) derive from polymeric aliphatic, cycloaliphatic or aromatic polycarboxylic acids and/or derivatives thereof, such as, for example, polyacrylic acid, polymethacrylic acid, and their anhydrides or their esters (esters of the acids with aliphatic, cycloaliphatic or aromatic alcohols having linear or branched, saturated or unsaturated carbon chains with 1 or 2 to 22 carbon atoms), maleic acid, maleic anhydride, fumaric acid, itaconic acid, and norbornenoic acid. Particular preference is given to polyacrylic acid and polymethacrylic acid and the derivatives thereof as mentioned above, and also to polyacrylic acid-maleic anhydride copolymers.

The number-average molecular weights of the polycarboxylic acids or copolymer polycarboxylic acids used may be between 200 and 2 000 000 g/mol, preferably between 1000 and 100 000 g/mol, more preferably between 1000 and 50 000 g/mol.

Furthermore, the main polymer comb may also comprise structural units which derive from further vinylic monomers such as, for example, styrene, acrylamide, α-methylstyrene, N-vinylpyrrolidone, N-vinylpyridine, N-vinylformamide, N-vinylcaprolactam, vinyl acetate, acrylamido-propylenesulfonic acid (AMPS), vinylsulfonic acid, vinylphosphonic acid, and the alkali metal, alkaline earth metal, and ammonium salts thereof, it being possible for the arrangement of the structural units to be random, alternating or blocklike.

A preferred embodiment of the invention are comb polymers in whose side chains component (B1) derives from:

Terephthalic acid, isophthalic acid, and their anhydrides or their esters, 1,3-cyclohexanedicarboxylic acid, 1,4-cyclohexanedicarboxylic acid; sulfoisophthalic acids, as for example 5-sulfoisophthalic acid, its anhydride, esters or the alkali metal salt or alkaline earth metal salt thereof, more particularly lithium salts and sodium salts or mono-, di-, tri- or tetraalkylammonium salts with $C_1$ to $C_{22}$ alkyl radicals.

A particularly preferred embodiment are comb polyesters whose side chains (B1) comprise structural elements which derive from terephthalic acid or dialkyl terephthalate, more particularly dimethyl terephthalate. Another particularly preferred embodiment are comb polyesters whose side chains (B1) comprise structural elements which derive from 5-sulfoisophthalic acid and/or its alkali metal or alkaline earth metal salts.

A preferred embodiment of the invention are comb polymers in whose side chains component (B2) derives from:

Ethylene glycol, a propanediol, as for example 1,2-propylene glycol, a butanediol, as for example 1,2-butylene glycol, a polyethylene glycol, as for example diethylene glycol, triethylene glycol, and tetraethylene glycol, a polypropylene glycol or a combination thereof.

Polyethylene glycols (PEG) and polypropylene glycols can have molar masses of 200 to 8000, preferably 500 to 8000 g/mol, especially PEG 200, PEG 300, PEG 400, PEG 500, PEG 600, PEG 750, PEG 800, PEG 1000, PEG 1500, PEG 1850, PEG 2000, PEG 3000, PEG 3350, PEG 4000, PEG 6000, PEG 8000.

It is also possible to use polymerization products of propylene glycol, ethylene glycol and/or butylene glycol in blocks, gradientwise or else in random distribution with molar masses from 90 to 20 000 g/mol, preferably from 200 to 6000 g/mol.

A preferred embodiment of the invention are comb polymers in whose side chains component (C) is derived from a polyalkoxy compound of the formula HO-(AO)$_x$R, where A is ethylene, propylene or butylene, x is a number from 2 to 100, preferably 2 to 40, more particularly 2 to 25, and R is $C_1$-$C_{20}$ alkyl, more particularly, methyl, ethyl, propyl or butyl, or $C_5$-$C_{30}$ aryl-alkenyl, such as tristyrylphenyl, examples being triethylene glycol monomethyl ether, triethylene glycol monobutyl ether, tetraethylene glycol monomethyl ether, pentaethylene glycol monomethyl ether or tristyrylphenol polyethoxylate having 10 to 30 EO units.

The comb polyesters are prepared by conventional methods, by reacting components (A), (B1), (B2), and (C) with one another in the presence of an esterification catalyst in the proportions indicated above, usefully at elevated temperatures. Compounds contemplated as esterification catalysts include the following: alkali metal hydroxides, alkali metal carbonates, and alkali metal acetates, alkaline earth metal oxides, hydroxides, carbonates, and acetates, and also alkali metal salts and alkaline earth metal salts of fatty acids having 6 to 22 carbon atoms. Also suitable are titanium compounds, such as titanates, metallic tin, and organotin compounds, such as monoalkyl tin and dialkyl tin derivatives, as esterification catalysts. The esterification/transesterification is carried out preferably using tin powder or titanium tetraisopropoxide as catalyst.

The esterification or transesterification is carried out preferably at temperatures from 120 to 280° C., with the more readily boiling condensate form (alcohols or water) being removed from the condensation product by distillation, preferably under a reduced pressure of up to <0.1 mbar.

For reasons of the reaction regime, there is no absolute uniformity of substitution prevailing in the target polymer; instead, a certain statistical breadth of distribution can be assumed in the substitution. Furthermore, certain reactive molecular moieties may also be observed to crosslink two or more polymer chains to form a more or less complex network.

The comb polymers of the invention are colorless to yellowish and odor-neutral. At a pH of 3 to 8 they are stable for a relatively long time with respect to hydrolysis, are highly amenable to formulation, are readily soluble in water, and are highly compatible with customary detergent compositions.

They endow the textile fibers with significantly enhanced soil release properties, and support the soil release capacity of the other detergent ingredients to a substantial extent, with respect to oily, greasy or colored stains.

The invention therefore also provides for the use of the comb polymers of the invention as soil release polymers in detergent compositions.

It may also be of advantage to use the comb polymers of the invention in laundry aftertreatment products, such as in a fabric softener, for example.

With the aid of comb polyesters in detergent compositions for hard surfaces, the surfaces treated can be given a capacity to repel soiling.

The invention therefore also provides detergent compositions comprising the comb polymers of the invention.

The detergent formulations in which the comb polymers are used may be in powder, granule, paste or gel form or liquid. Examples of such formulations include heavy-duty laundry detergents, light-duty laundry detergents, color laundry detergents, wool laundry detergents, curtain laundry detergents, modular laundry detergents, laundry detergent tablets, bar soaps, scouring salts, laundry starches and stiffeners, and ironing aids. The comb polyesters of the invention may also be used in household detergents, examples being general-purpose cleaners, dishwashing compositions, carpet-cleaning compositions, impregnating compositions, cleaning products and polishes for floors and other hard surfaces, of plastic, ceramic or glass, for example.

Examples of technical detergent compositions are compositions for the cleaning and care of plastics, such as for housings and automobile fittings, and also detergent compositions and polishes for painted surfaces such as automobile bodies, for instance.

The laundry detergent, polish, and cleaning product formulations of the invention contain at least 0.1% by weight, preferably between 0.1% to 10% by weight and more preferably 0.2% to 3% by weight, of the comb polymers of the invention, based on the completed compositions.

The formulations will be adapted in terms of their composition to the nature of the textiles to be treated or washed or to the surfaces that are to be cleaned, according to their intended application.

The detergent compositions of the invention may comprise customary ingredients, such as surfactants, emulsifiers, builders, bleaching catalysts, bleach activators, sequestrants, antiredeposition agents, color transfer inhibitors, color fixatives, enzymes, optical brighteners, and softening components. Moreover, formulations or parts of the formulation in the sense of the invention may be given specific coloring and/or perfuming by means of dies and/or fragrances.

The overall concentration of surfactants in the completed detergent formulation can be from 1% to 99% by weight, preferably from 5% to 80% by weight. The surfactants used may be anionic, nonionic, amphoteric, and cationic. Mixtures of the stated surfactants may be used as well. Preferred detergent formulations comprise anionic and/or nonionic surfactants, and mixtures thereof with further surfactants;

Anionic surfactants contemplated include sulfates, sulfonates, carboxylates, phosphates, and mixtures thereof. Suitable cations in this context are alkali metals, such as sodium or potassium, for example, or alkaline earth metals, such as calcium or magnesium, for example, and also ammonium, substituted ammonium compounds, including mono-, di- or triethanolammonium cations, and mixtures thereof. The following types of anionic surfactants are of particular interest and are described at length in EP 1 035 194 A2:

Alkyl ester sulfonates, alkyl sulfates, alkyl ether sulfates, alkylbenzenesulfonates, alkenylbenzenesulfonates, alkanesulfonates, and soaps.

Nonionic surfactants contemplated include, for example, the following compounds, which are described at length in EP 1 035 194 A2:

polyethylene, polypropylene, and polybutylene oxide condensates of alkylphenols;

condensation products of aliphatic alcohols with about 1 to about 25 mol of ethylene oxide;

condensation products of ethylene oxide with a hydrophobic basis, formed by condensing propylene oxide with propylene glycol;

condensation products of ethylene oxide with a reaction product of propylene oxide and ethylenediamine;

semipolar nonionic surfactants;

fatty acid amides;

alkyl- and alkenyloligoglycosides and also fatty acid, polyglycol esters or fatty amine polyglycol esters having in each case 8 to 20, preferably 12 to 18, carbon atoms in the fatty alkyl radical, alkoxylated triglycamides, mixed ethers or mixed formyls, alkyloligoglycosides, alkenyloligoglycosides, fatty acid N-alkylglucamides, phosphine oxides, dialkyl sulfoxides, and protein hydrolysates;

amphoteric or zwitterionic surfactants;

Suitable cationic surfactants are substituted or unsubstituted straight-chain or branched quaternary ammonium salts, as described at length in EP 1 035 194 A2.

Emulsifiers contemplated include the following: adducts of 0 to 30 mol of alkylene oxide, more particularly ethylene oxide, propylene oxide and/or butylene oxide, with linear or branched, saturated or unsaturated fatty alcohols having 8 to 22 carbon atoms, with fatty acids having 12 to 22 carbon atoms, with alkylphenols having 8 to 15 carbon atoms in the alkyl group, and with sorbitan esters;

($C_{12}$-$C_{18}$)-fatty acid monoesters and diesters of adducts of 0 to 30 mol of ethylene oxide with glycerol;

glycerol monoesters and diesters and sorbitan monoesters and diesters of saturated and unsaturated fatty acids having 6 to 22 carbon atoms and optionally their ethylene oxide adducts;

adducts of 5 to 60 mol, preferably 15 to 60 mol, of ethylene oxide with castor oil and/or hydrogenated castor oil;

polyol esters and especially polyglycerol esters, such as polyglycerol polyricinoleate and polyglycerol poly-12-hydroxystearate, for example.

Further detergent ingredients which may be present in the present invention include inorganic and/or organic builders, in order to reduce the hardness of the water, and are described at length in EP 1 035 194 A2.

The detergent compositions of the present invention may optionally comprise one or more conventional bleaches, and also activators or stabilizers, more particularly peroxy acids, which do not react with the polyesters of the invention. They are described at length in EP 1 035 194 A2.

The detergent compositions of the invention may comprise one or more conventional enzymes. Examples of such enzymes include lipases, amylases, proteases, cellulases, pullinases, cutinases, and peroxidases. Proteases available include BLAP®, Opticlean®, Maxacal®, Maxapem®, Esperase®, Savinase®, Purafect®, OxP and/or Duraxym®; amylases available include Termamyl®, Amylase-LT®, Maxamyl®, Duramyl® and/or Pruafect® OxAm; and lipases available include Lipolase®, Lipomax®, Lumafast® and/or Lipozym®. They are described at length in EP 1 035 194 A2.

Antiredeposition agents contemplated include carboxymethylcellulose, methylcellulose, hydroxyalkylcellulose, methylhydroxyethylcellulose, methylhydroxypropylcellulose, methylcarboxymethylcellulose, and polyvinylpyrrolidone.

Also contemplated are color transfer inhibitors, examples being polyamine N-oxides such as poly(4-vinylpyridine N-oxide), e.g., Chromabond S-400 from ISP; polyvinylpyrrolidone, e.g., Sokalan® HP50 from BASF; and copolymers of N-vinylpyrrolidone with N-vinylimidazole and optionally other monomers.

The invention also includes detergent compositions comprising active color fixative substances, examples being color fixatives obtained by reacting diethylenetriamine, dicyandiamide, and amidosulfuric, acid, amines with epichlorohydrin, for example dimethylaminopropylamine and epichlorohydrin or dimethylamine and epichlorohydrin or dicyandiamide, formaldehyde and ammonium chloride, or dicyandiamide, ethylenediamine and formaldehyde or cyanamide with amines and formaldehyde or polyamines with cyanamides and amidosulfuric acid or cyanamides with aldehydes and ammonium salts, but also polyamine N-oxides such as poly (4-vinylpyridine N-oxide), e.g., Chromabond® S-400 from ISP; polyvinylpyrrolidone, e.g., Sokalan® HP50 from BASF; and copolymers of N-vinylpyrrolidone with N-vinylimidazole and optionally other monomers.

The detergent compositions of the invention may comprise complexing agents, examples being aminocarboxylates, such as ethylenediaminetetraacetate, N-hydroxyethylethylenediaminetriacetate, nitrilotriacetate, ethylenediaminetetrapropionate, triethylenetetraamine-hexaacetate, diethylenetriaminepentaacetate, cyclohexanediaminetetra-acetate, phosphonates, for example azocycloheptanediphosphonate, Na salt, pyrophosphates, etidronic acid (1-hydroxyethylidene-1,1-diphosphonic acid, 1-hydroxyethane-1,1-diphosphonic acid, acetophosphonic acid) and its salts, aminophosphonates, such as ethylenediaminetetrakis-(methylenephosphonate), diethylenetriaminepentakis (methylene-phosphonate), aminetrimethylenephosphonic acid, cyclodextrins, and also aromatic complexing agents with polyfunctional substitution, such as dihydroxydisulfobenzene or ethylenediaminedisuccinates.

Optical brighteners which can be used include cyclic hydrocarbons such as distyrylbenzenes, distyrylbiphenyls, diphenylstilbenes, triazinylaminostilbenes, stilbenyl-2H-triazoles, as for example stilbenzyl-2H-naphthol[1,2-d]triazoles and bis(1,2,3-triazol-2-yl)stilbenes, benzoxazoles, as for example stilbenylbenzoxazole and bis(benzoxazole), furans, benzofurans, and benzimidazoles, as for example bis(benzo[b]furan-2-yl)biphenyl and cationic benzimidazoles, 1,3-diphenyl-2-pyrazoline, coumarin, naphthalimides, 1,3,5-2-yl derivatives, methine cyanine, and dibenzothiophene 5,5-oxide.

Preference is given to anionic optical brighteners, more particularly sulfonated compounds.

The laundry detergents of the invention may comprise optical brighteners in amounts from 0.001% to 2% by weight, preferably 0.002% to 0.8% by weight, more preferably 0.003% to 0.4% by weight.

Softening components used may be quaternary ammonium salts, which are described at length in EP 1 035 194 A2.

The detergent compositions of the invention may also comprise dyes and fragrances or perfumes.

Additionally provided by the invention are solid dishwashing compositions which comprise the comb polyesters of the invention. These are compositions for the machine cleaning of glass, porcelain, cutlery, metalware, and plasticware. The comb polyesters bring about very good wash-water or rinse-water runoff from the surfaces of the stated ware. This reduces the drying time in the dishwasher and the cleaned ware is obtained without residue or spotting. Moreover, these polyesters have very good water solubility and therefore make it possible to reduce the amount of wash water. The amount of comb polyesters used in accordance with the invention in solid machine dishwasher detergent formulations may vary within wide limits and is generally 0.1% to 10% by weight, preferably 0.5% to 5% by weight, more preferably 1% to 3% by weight, based on the respective formulation.

The solid machine dishwashing detergents of the invention may be presented as powders, as granules or in the form of tablets.

The solid dishwashing compositions of the invention may be produced in known ways, as for example by simple mixing of the comb polyesters in powder or granule form with the other ingredients of the dishwashing formulation in the corresponding quantities for use.

The solid dishwashing compositions of the invention may also be offered as extruded shapes. In this case, a solid and substantially free-flowing mixture of the ingredients or of some of the ingredients of the dishwashing formulation is extruded in strand form under pressure, and the strand, following its emergence from the perforated die, is cut using a cutting device to the granule dimensions, which can be set beforehand.

A preferred embodiment of the invention are dishwasher detergents in tablet form, which may be single-phase or multiphase, single-colored or multicolored, and in particular may consist of one layer or of a plurality of layers, more particularly of two layers.

The solid dishwashing detergents of the invention comprise the customary constituents, selected essentially from surfactants, preferably nonionic surfactants, enzymes, amino acids and their salts, builders, cobuilders, bleaches, organic acids, hydrotropes, dyes, fragrances, further specific auxiliaries and adjuvants such as, for example, antioxidants, zeolites, salts, bleach activators, bleaching catalysts, photoactive metal oxides, photoactive nanoparticles, photoactivators, enzyme stabilizer additives, fungicides, bactericides, scale inhibitors, antistatic additives, foam regulators, color transfer inhibitors, odor scavengers, polymers, pigments, pH control agents, UV absorption agents, optical brighteners, dispersants, complexing agents, preservatives, and glass corrosion agents.

In the machine dishwashing detergents, low-foam compounds are preferred. These are, in particular, nonionic surfactants, preferably alkoxylated, advantageously ethoxylated, especially primary alcohols having preferably 8 to 22 carbon atoms and on average 1 to 25 mol of ethylene oxide (EO) per mole of alcohol, in which the alcohol radical may be linear or methyl-branched preferably in position 2, or may comprise linear and methyl-branched radicals in a mixture, of the kind typically present in oxo-process alcohol radicals. Particularly preferred, however, are alcohol ethoxylates with linear radicals from alcohols of natural origin having 10 to 20 carbon atoms, such as from coconut, palm, tallow fat or oleyl alcohols, for example, and having on average 2 to 18 EO per mole of alcohol. The degree of ethoxylation represents a statistical average value, which for a specific product may be a whole or fractional number. The alcohol ethoxylates may have a narrowed or broad homolog distribution of the ethylene oxide (narrow range ethoxylates or broad range ethoxylates). This class of product includes the Genapol® ™ products from Clariant Produkte (Deutschland) GmbH.

The polyesters of the invention may also be employed in separate rinse aid formulations.

One particularly preferred embodiment are solid dishwash detergent formulations with integrated rinse aid, comprising the comb polyesters of the invention and also 0% to 50% by weight of phosphates, preferably pentasodium triphosphate, 0% to 5% by weight of phosphonates, 0% to 50% by weight of sodium citrate, 0% to 10% by weight of sodium polycarboxylates, 0% to 40% by weight of sodium carbonate, 0% to 25% by weight of sodium hydrogen carbonate, 0% to 30% by weight of sodium disilicate, 5% to 15% by weight of bleach, preferably sodium perborate, 1% to 5% by weight of bleach activator, preferably TAED, 1% to 5% by weight of enzymes, preferably proteases and amylases, 1% to 10% by weight of nonionic surfactants, preferably fatty alcohol alkoxylates and polyethylene glycol, 0% to 2% by weight of paraffins, 0% to 1% by weight of silver protectant, fragrances and dyes.

EXAMPLE 1

Comb Polyester 1

A 2 l four-neck flask with KPG stirrer, internal thermometer, gas inlet tube, and distillation bridge was charged with 175 g of ethanediol, 175 g of 1,2-propanediol, 120 g of tetraethylene glycol monomethyl ether, and 0.6 g of titanium tetraisopropoxide, this initial charge was stirred together, and then 0.6 g of sodium carbonate and 118.5 g of the Na salt of dimethyl 5-sulfoisophthalate, 265.8 g of terephthalic acid, and 3.0 g of polyacrylic acid (2500 g/mol) were introduced. Thereafter the flask was twice evacuated and rendered inert with $N_2$. Then, with stirring, heating to 170° C. took place over the course of 30 minutes. Transesterification and distillation began at about 173° C. Over the course of 2 hours, the internal temperature was raised to 210° C. Thereafter the internal temperature was raised to about 225° C. and condensation was continued for 30 minutes more. Subsequently, over the course of 30 minutes, the pressure was reduced to a vacuum<1 mbar and condensation was continued at 230° C. for 3 hours. The melt viscosity obtained at the end of the condensation phase was 10 000 mPas at 230° C. Then $N_2$ was admitted and the melt was discharged at 200° C. The melt viscosity of the polyester melt on discharge was 25 000 mPas.

In the same way as with the reaction regime for example 1, the following comb polyesters 2 to 8 were prepared.

EXAMPLE 2

Comb Polyester 2

| Raw material | Mass (g) |
| --- | --- |
| Terephthalic acid | 265.8 |
| 5-Sulfoisophthalic acid, Na salt | 118.5 |
| Triethylene glycol monomethyl ether | 150 |
| Polyacrylic acid | 3.0 g/2500 g/mol |
| Sodium carbonate | 0.6 |
| Titanium tetraisopropoxide | 0.6 |
| 1,2-Propanediol | 175 |
| Ethylene glycol | 175 |

Melt viscosity at 230° C.: 12 000 mPas
Melt viscosity at 200° C.: 30 000 mPas

EXAMPLE 3

Comb Polyester 3

| Raw material | Mass (g) |
| --- | --- |
| Terephthalic acid | 132.9 |
| 5-Sulfoisophthalic acid, Na salt | 118.5 |
| Tetraethylene glycol monomethyl ether | 120 |
| Polyacrylic acid-maleic anhydride | 4.5 g/3000 g/mol |
| Sodium carbonate | 1.0 |
| Titanium tetraisopropoxide | 0.6 |
| Polyethylene glycol 1500 | 75 |
| Ethylene glycol | 250 |

Melt viscosity at 230° C.: 8000 mPas
Melt viscosity at 200° C.: 20 000 mPas

EXAMPLE 4

Comb Polyester 4

| Raw material | Mass (g) |
| --- | --- |
| Dimethyl isophthalate | 120 |
| Dimethyl terephthalate | 75 |
| Dimethyl 5-sulfoisophthalate, Na salt | 196 |
| Pentaethylene glycol monomethyl ether | 140 |
| Polyacrylic acid | 3.0 g/2000 g/mol |
| Sodium carbonate | 0.6 |
| Titanium tetraisopropoxide | 0.6 |
| Polyethylene glycol 6000 | 100 |
| 1,2-Propanediol | 200 |

Melt viscosity at 230° C.: 5000 mPas
Melt viscosity at 200° C.: 17 000 mPas

EXAMPLE 5

Comb Polyester 5

| Raw material | Mass (g) |
| --- | --- |
| Dimethyl terephthalate | 200 |
| Dimethyl 5-sulfoisophthalate, Na salt | 196 |
| Triethylene glycol monobutyl ether | 110 |
| Polyacrylic acid | 3.5 g/2000 g/mol |
| Sodium carbonate | 0.6 |
| Titanium tetraisopropoxide | 0.6 |
| 1,2-Propanediol | 400 |

Melt viscosity at 230° C.: 19 000 mPas
Melt viscosity at 200° C.: 50 000 mPas

EXAMPLE 6

Comb Polyester 6

| Raw material | Mass (g) |
| --- | --- |
| Dimethyl terephthalate | 200 |
| Dimethyl 5-sulfoisophthalate, Na salt | 196 |
| Tristyrylphenol + 20 EO | 220 |
| Polyacrylic acid-maleic anhydride | 4.5 g/3000 g/mol |
| Sodium carbonate | 0.6 |
| Titanium tetraisopropoxide | 0.6 |
| 1,2-Propanediol | 220 |
| Ethylene glycol | 150 |

Melt viscosity at 230° C.: 10 000 mPas
Melt viscosity at 200° C.: 35 000 mPas

EXAMPLE 7

Comb Polyester 7

| Raw material | Mass (g) |
| --- | --- |
| Dimethyl isophthalate | 120 |
| Dimethyl terephthalate | 75 |
| Dimethyl 5-sulfoisophthalate, Na salt | 196 |
| Pentaethylene glycol monomethyl ether | 140 |
| Polyacrylic acid-Co—Na-AMPS (weight ratio 1:5) | 7.0 g/5500 g/mol |
| Sodium carbonate | 0.6 |
| Titanium tetraisopropoxide | 0.6 |
| Polyethylene glycol 6000 | 100 |
| 1,2-Propanediol | 220 |

Melt viscosity at 230° C.: 6000 mPas
Melt viscosity at 200° C.: 18 000 mPas

EXAMPLE 8

Comb Polyester 8

| Raw material | Mass (g) |
| --- | --- |
| Dimethyl terephthalate | 200 |
| Dimethyl 5-sulfoisophthalate, Na salt | 196 |
| Triethylene glycol monobutyl ether | 110 |
| Polyacrylic acid-Co-methyl methacrylate | 3.5 g/2000 g/mol |
| Sodium carbonate | 0.6 |
| Titanium tetraisopropoxide | 0.6 |
| 1,2-Propanediol | 400 |

Melt viscosity at 230° C.: 18 000 mPas
Melt viscosity at 200° C.: 48 000 mPas

In order to highlight the difference between comb polymers having anionic endcap groups and the analogous comb polymers with nonionic endcap groups, in terms of their melt viscosities, comparative tests were carried out with a structure that was analogous as far as possible, and the melt viscosities thereof were ascertained at 200° C. and 230° C.

It should be noted here that viscosities above 50 000 mPas are difficult if not impossible to manage on the production scale.

COMPARATIVE EXAMPLES

Comb Polyesters with End Groups Containing Sulfo Groups

Comparative Example 1

A 2 l four-neck flask with KPG stirrer, internal thermometer, gas inlet tube, and distillation bridge was charged with 175 g of ethanediol, 175 g of 1,2-propanediol, 100 g of isethionic acid, Na salt, and 0.6 g of titanium tetraisopropoxide, this initial charge was stirred together, and then 0.6 g of sodium carbonate and 118.5 g of the Na salt of dimethyl 5-sulfoisophthalate, 265.8 g of terephthalic acid, and 3.0 g of polyacrylic acid (2500 g/mol) were introduced. Thereafter the flask was twice evacuated and rendered inert with $N_2$. Then, with stirring, heating to 170° C. took place over the course of 30 minutes. Transesterification and distillation began at about 173° C. Over the course of 2 hours, the internal temperature was raised to 210° C. under atmospheric pressure. Thereafter the internal temperature was raised to about 225° C. and condensation was continued for 30 minutes more. Subsequently, over the course of 30 minutes, the pressure was reduced to <1 mbar and condensation was continued at 230° C. for 3 hours. The melt viscosity obtained at the end of the condensation phase was 50 000 mPas. Then $N_2$ was admitted and the melt was discharged at 200° C. The melt viscosity of the polyester melt on discharge was about 250 000 mPas.

Comparative Example 2

A 2 l four-neck flask with KPG stirrer, internal thermometer, gas inlet tube, and distillation bridge was charged with 210 g of ethanediol, 50 g of 1,2-diethylene glycol, 75 g of 3-sulfobenzoic acid, Na salt, and 0.6 g of titanium tetraisopropoxide, this initial charge was stirred together, and then 0.6 g of sodium carbonate and 118.5 g of the Na salt of dimethyl 5-sulfoisophthalate, 300 g of terephthalic acid, and 4 g of polyacrylic acid (2500 g/mol) were introduced. Thereafter the flask was twice evacuated and rendered inert with $N_2$. Then, with stirring, heating to 170° C. took place over the course of 30 minutes. Transesterification and distillation began at about 173° C. Over the course of 2 hours, the internal temperature was raised to 210° C. under atmospheric pressure. Thereafter the internal temperature was raised to about 225° C. and condensation was continued for 30 minutes more. Subsequently, over the course of 30 minutes, the pressure was reduced to <1 mbar and condensation was continued at 230° C. for 3 hours. The amount of condensate expected theoretically at the end of the condensation phase was not attained. On account of the very high melt viscosity (>100 000 mPas), the experiment was terminated prematurely.

| Phosphate-containing machine dishwashing detergent powder | |
|---|---|
| Sodium tripolyphosphate | 43.5% |
| SKS-6 HD-D (phyllosilicate) | 10.0% |
| Sodium carbonate, heavy | 29.5% |
| Comb polyester 1 | 1.0% |
| Percarbonate | 10.0% |
| TAED (Peractive CB) | 2.0% |
| Nonionic surfactant (Genapol EP 0244) | 1.5% |
| Protease (Savinase 8.0 T (Novozymes)) | 1.5% |
| Amylase (Termamyl 120 T (Novozymes)) | 1.0% |

| Reduced-phosphate machine dishwashing detergent (tablet, multifunctional) | |
|---|---|
| Sodium tripolyphosphate | 24.0% |
| Sodium carbonate | 33.0% |
| Comb polyester 4 | 1.0% |
| Disilicate | 5.0% |
| Sodium citrate | 7.2% |
| Percarbonate | 10.0% |
| TAED | 2.0% |
| Nonionic surfactant (Genapol EP 2584) | 1.5% |
| Polyglycol | 8.5% |
| Polycarboxylate | 5.0% |
| Enzymes | 2.5% |
| Fragrance | 0.3% |

| Phosphate-free machine dishwashing detergent (tablet, multifunctional) | |
|---|---|
| SKS-6 HD | 10.0% |
| Sodium carbonate, heavy | 28.5% |
| Sodium citrate | 29.5% |
| Comb polyester 3 | 1.0% |
| Percarbonate | 10.0% |
| TAED | 3.0% |
| Polycarboxylate | 5.5% |
| Enzymes (protease, amylase) | 3.0% |
| Genapol EP 2584 | 4.0% |
| Polyglycol | 5.2% |
| Fragrance | 0.3% |

| Chlorine-containing dishwashing detergent for USA | |
|---|---|
| Sodium tripolyphosphate | 33.5% |
| Sodium carbonate | 26.5% |
| Disilicate, amorphous or crystalline | 9.0% |
| Sodium sulfate | 26.5% |
| Comb polyester (5) | 1.5% |
| Nonionic surfactant (Genapol EP 0244) | 1.5% |
| Sodium dichlorocyanurate | 1.5% |

The invention claimed is:

1. A comb polymer composed of a main polymer chain and of polyester side chains linked via ester groups to the main polymer chain, wherein
   (i) the main polymer chain is a polycarboxylic acid or a copolymer polycarboxylic acid (A),
   (ii) the polyester side chains comprise the constituents (B1) $C_8$ dicarboxylic acids, which are optionally sulfonated, (B2) diols and/or polyol ethers having 2 OH groups, and (C) nonionic end groups of the formula —O-(AO)$_x$R, where A is ethylene, propylene or butylene, x is a number from 1 to 100, and R is a hydrocarbon radical having 1 to 30 carbon atoms;

(iii) the total mass percentage of the polyester side chains B1+B2+C is 80% to 99.9%, based on the total mass of the comb polymer; and (iv) the polyester side chains are obtained by an esterification reaction of components B1, B2, and C in a B1+B2/C mass ratio of 2:1 to 100:1.

2. A comb polymer as claimed in claim 1, wherein the polycarboxylic acid (A) is a poly(meth)acrylic acid.

3. A comb polymer as claimed in claim 1, wherein component (B1) is selected from the group consisting of terephthalic acid, isophthalic acid, cyclohexanedicarboxylic acid, a sulfoisophthalic acid and combinations thereof.

4. A comb polymer as claimed in claim 1, wherein component (B2) is selected from the group consisting of ethylene glycol, a propanediol, a butanediol, a polyethylene glycol, a polypropylene glycol and combinations thereof.

5. A comb polymer as claimed in claim 1, wherein component (C) derives from a polyalkoxy compound of the formula HO-(AO)$_x$R, where A is ethylene, propylene or butylene, x is a number from 2 to 100, and R is methyl, ethyl, propyl, butyl or tristyrylphenyl.

6. A comb polymer as claimed in claim 5, wherein the polyalkoxy compound is selected from the group consisting of triethylene glycol monomethyl ether, triethylene glycol monobutyl ether, tetraethylene glycol monomethyl ether, pentaethylene glycol monomethyl ether, and tristyrylphenol polyethoxylate having 10 to 30 EO units.

7. A comb polymer as claimed in claim 1, wherein the total mass percentage of the polyester side chains B1+B2+C is 90% to 99.8%, based on the total mass of the comb polymer.

8. A comb polymer as claimed in claim 1, wherein the polyester side chains are obtained by an esterification reaction of components B1, B2 and C in a B1+B2/C mass ratio of 3:1 to 40:1.

9. A comb polymer as claimed in claim 1, wherein the comb polymer has a melt viscosity of not more than 50 000 mPas at a temperature of 200° C.

10. A comb polymer as claimed in claim 1, wherein the comb polymer has an average molar mass Mn of 800 to 25 000 g/mol.

11. A process for preparing a comb polymer as claimed in claim 1, comprising the step of reacting components (A), (B1), (B2), and (C) with one another in the presence of an esterification catalyst.

12. A process for soil release, comprising the step of contacting a soiled article with a comb polymer as claimed in claim 1.

13. A detergent composition comprising a comb polymer as claimed in claim 1.

14. A detergent composition as claimed in claim 13, containing between 0.1% and 10% by weight of comb polymer, based on the completed composition.

* * * * *